(12) United States Patent
Nomura

(10) Patent No.: US 6,373,993 B1
(45) Date of Patent: Apr. 16, 2002

(54) IMAGE PROCESSING METHOD AND IMAGE PROCESSING APPARATUS

(75) Inventor: Shouichi Nomura, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/259,266

(22) Filed: Mar. 1, 1999

(30) Foreign Application Priority Data

Mar. 3, 1998 (JP) ............................................. 10-050400

(51) Int. Cl.$^7$ ................................................ H04N 1/40
(52) U.S. Cl. ...................................... 382/274; 358/446
(58) Field of Search ......................... 382/274; 358/446, 358/468, 475, 509, 520

(56) References Cited

U.S. PATENT DOCUMENTS

| | | | | |
|---|---|---|---|---|
| 4,728,791 A | * | 3/1988 | Goto | 250/327.2 |
| 5,208,874 A | * | 5/1993 | Omura | 382/54 |
| 5,250,980 A | * | 10/1993 | Yakubo | 355/32 |
| 5,455,428 A | * | 10/1995 | Miyagawa | 250/586 |
| 5,665,962 A | * | 9/1997 | Kimura | 250/226 |

FOREIGN PATENT DOCUMENTS

| | | | | |
|---|---|---|---|---|
| EP | 0 587 978 A1 | 3/1993 | ............ | H04N/1/40 |
| JP | 60-259053 | * 12/1985 | ............ | H04N/1/04 |
| JP | 60-263567 | * 12/1985 | ............ | H04N/1/04 |
| JP | 361162036 A | * 7/1986 | ............ | G03B/42/02 |
| JP | 403089663 A | * 4/1991 | ............ | H04N/1/00 |
| JP | 08056282 A | * 2/1996 | ............ | H04N/1/19 |
| JP | 11249241 A | * 9/1999 | ............ | G03B/27/72 |

OTHER PUBLICATIONS

European Search Report dated Oct. 21, 1999.

\* cited by examiner

*Primary Examiner*—Jerome Grant, II
(74) *Attorney, Agent, or Firm*—Finnegan, Henderson, Farabow, Garrett & Dunner, L.L.P.

(57) ABSTRACT

An image processing apparatus is provided with an optical system to for irradiating light to an image document, for detecting light transmitting through the image document or light reflected from the image document and for converting the light into electric signals, thereby obtaining a first image information, the optical system having an amount of flare; a flare amount memory for memorizing an amount of flare of the optical system; a flare component calculator for obtaining a flare component contained in the first image information on the basis of the first image information and the flare amount of the optical system; and a controller for determining on the basis of the flare component a copy condition on which the image document is copied.

24 Claims, 8 Drawing Sheets

31 HIGH DENSITY AREA
32 PATCH

33 LOW DENSITY AREA
32 PATCH

IMAGE PROCESSING METHOD AND IMAGE PROCESSING APPARATUS

BACKGROUND OF THE INVENTION

This invention relates to an image processing method and an image processing apparatus, and in particular, to an image processing method and an image processing apparatus suitable for use in an image printer.

In a conventional photographic print system, in order to obtain a well finished photographic print, it is actualized an image processing method in which an original to be printed is divided into a plurality of pixels beforehand for measuring light intensity, image data for evaluation is obtained, the characteristic values of the image are obtained, and a proper condition for printing is automatically obtained.

There are a variety of printing conditions such as, for example, 'an average density value' for determining the duplicating conditions for images having a normal brightness distribution of photographic objects, 'a density correction value' for making the correction of brightness in the case where the brightness distribution of photographic objects is deviated from a normal form, and 'a color correction value' for correcting the color tone in the case where the average color balance is deviated from no color. The print exposure time and the exposure light intensity for a photographic paper have been determined on the basis of these print processing conditions to carry out the printing for duplicating an original.

On the other hand, it has been developed a digital photographic print system wherein image data are obtained by dividing an original into a plurality of pixels for measuring light by means of a scanner, a proper printing conditions are automatically obtained by the above-mentioned processing method, and on the basis of these, the aforesaid obtained image data are outputted to various kinds of image outputting apparatus after being subjected to a gradation conversion.

In order to obtain a proper printing conditions from the image characteristic values, it is often the case that mathematical equations such as a product and sum equation, a discriminant, and a conditional equation are used (hereinafter these are referred to as correction equations). The most suitable correction equation often varies depending on the magnitude and the character of the characteristic values to be obtained, and it is necessary that the equation is re-obtained in accordance with the kinds of means for obtaining the image data for evaluation, resulting in spending a large amount of time and labor.

Further, in a digital photographic print system, the quality of the image read by the scanner has greatly influenced the quality of the photographic print. In particular, if there is a large amount of flare component in the optical system for image reading of the scanner resulting from the inner surface reflection etc., taking an image from a negative-film for instance, the reproduced image is made to have an incomplete highlight portion and a poor modulation.

However, in the case where a smooth gradation expression, a high quality impression, and a stereoscopic impression are important, as in the case of depicting the face in the photography of a woman, for example, it is desirable that there is a certain measure of flare component; therefore, the real situation is that it does not exist an ideal optical system for reading an image that can read satisfactorily various kinds of images.

SUMMARY OF THE INVENTION

This invention has been made in consideration of the above-mentioned subject, and it is the first object of it to provide an image processing method and an image processing apparatus which can obtain a stable good photographic quality by adjusting the influence of the flare in the image reading system, and it is the second object of the invention to provide an image processing method and an image processing apparatus which can actualize a favorable photographic quality by making it possible to suitably adjust the flare quantity in the image reading system.

The above-mentioned objects of the invention can be accomplished by the following structures, methods and memory media memorizing the methods.

A) An image processing apparatus, comprises:

an optical system to for irradiating light to an image document, for detecting light transmitting through the image document or light reflected from the image document and for converting the light into electric signals, thereby obtaining a first image information, the optical system having an amount of flare;

flare amount memorizing means for memorizing an amount of flare of the optical system;

flare component calculating means for obtaining a flare component contained in the first image information on the basis of the first image information and the flare amount of the optical system; and determining means for determining on the basis of the flare component a copy condition on which the image document is copied.

B) An image processing apparatus, comprises:

an optical system for irradiating light to an image document, for detecting light transmitting through the image document or light reflected from the image document and for converting the light into electric signals, thereby obtaining a first image information, the optical system having an amount of flare;

flare amount memorizing means for memorizing the amount of flare of the optical system;

flare component calculating means for obtaining a flare component contained in the first image information on the basis of the first image information and the flare amount of the optical system; and image processing means for applying an image processing to the first image information on the basis of the flare component, thereby obtaining a second image information.

C) An image processing method, comprises steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and determining on the basis of the flare component a copy condition on which the image document is copied.

D) An image processing method, comprises steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and applying an image processing to the first image information on the basis of the flare component and obtaining a second image information.

E) A memory medium capable of memorizing a program capable of executing steps in such a manner that the program can be read from the memory medium by a computer, the steps comprises steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and determining on the basis of the flare component a copy condition on which the image document is copied.

F) A memory medium capable of memorizing a program capable of executing steps in such a manner that the program can be read from the memory medium by a computer, the steps comprises steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and applying an image processing to the first image information on the basis of the flare component and obtaining a second image information.

The above-mentioned objects of the invention can be accomplished by any one of the methods and apparatus to be described in the following as preferable embodiments:

(1) An image processing method which measures light for each pixel, obtains image characteristic values on the basis of the data of said measured light, and determines the conditions for duplicating the original on the basis of said image characteristic values, wherein the flare quantity in the light measuring optical system carrying out said measurement of light is obtained, the flare component in said characteristic values is eliminated on the basis of said flare quantity, and the conditions for duplicating the original are determined.

According to this method, correct image characteristic values can be obtained by eliminating the influence of the flare completely, and an image of stable quality can be obtained.

(2) An image processing method which divides an image of an original into a plurality of pixels for measuring light, obtains image characteristic values on the basis of the data of said measured light, and determines the conditions for duplicating the original on the basis of said image characteristic values, wherein the flare quantity in the light measuring optical system of the image processing apparatus is obtained, and the flare component in said image characteristic values is converted into a flare quantity equivalent to a predetermined standard flare quantity from the difference between the above-obtained flare quantity and said standard flare quantity.

According to this method, an image quality optimized by a standard unit can be obtained simply, by modifying the image characteristic values from the difference between the predetermined standard flare quantity and the measured flare quantity and determining the conditions for duplicating the original.

(3) An image processing method which measures light for each pixel, and makes image output after executing a predetermined gradation conversion processing, wherein the flare quantity in the light measuring optical system carrying out said measurement of light is obtained and a gradation correcting process for correcting said flare is made.

According to this method, an image having a high modulation influenced by no flare component can be obtained by executing the gradation correcting process making the flare zero on the basis of the flare quantity in the light measuring optical system.

(4) An image processing method which measures light for each pixel, and makes image output after executing a predetermined gradation conversion processing, wherein the flare quantity in the light measuring optical system carrying out said measurement of light is obtained, and said image is converted into an image having a flare quantity equivalent to the predetermined standard value.

According to this method, an image quality having a smooth gradation and a high modulation can be obtained by making a flare correction for an arbitrary flare quantity on the basis of the flare quantity of the light measuring optical system and the predetermined standard value.

(5) An image processing method set forth in the paragraph (2) or (4), wherein the aforesaid standard flare quantity is determined to be a value varying in accordance with the kinds of original images.

According to this method, an optimum standard flare quantity can be determined for the originals having different characteristic values such as a negative-film and a positive-film (a slide-film); hence, a more favorable image quality can be obtained.

(6) An image processing method set forth in any one of the foregoing paragraphs, wherein the aforesaid flare quantity is calculated in such a way as described below:

a first image is obtained by reading a first original having two areas, that is, a central portion which is an area equal to or smaller than one forth of the whole original area and a peripheral portion which is an area except said central portion, by means of the aforesaid light measuring optical system, and a second image is obtained by reading a second original which has a density lower than said first original only in said peripheral portion by 1.0 to 2.5 by means of said light measuring optical system; then the flare quantity F1 is calculated by the following equation:

$$F1=(PC-PA)/PB,$$

where PA is the average of the measured light values in the central area of the first image, PB is the average of the measured light values in the whole area of the second image, and PC is the average of the measured light values in the central area of the second image.

According to this method, a measurement of a flare quantity having a sufficiently high brightness can be simply and quickly done without making a remarkable alteration to the image reading system.

(7) An image processing apparatus comprising an image inputting means for obtaining an original image data by measuring light for each pixel, a flare quantity correcting means for converting said original image data into a flare-corrected image on the basis of the flare quantity in said image inputting means and a predetermined standard flare quantity, an image processing means for obtaining image characteristic values of the original and determining the conditions for duplicating the image from said image characteristic values, and an image recording means for recording said flare-corrected image on an image recording medium on the basis of said conditions for duplicating.

According to this structure, the flare quantity of the image inputting means contained in the read image can be adjusted to a predetermined quantity; hence, a print quality suitable for the purpose can be obtained.

(8) An image processing apparatus set forth in the paragraph (7) further comprising a standard value memorizing means for memorizing a plurality of standard flare quantities, wherein the aforesaid flare quantity correcting means has a function to select out one standard flare quantity from said standard value memorizing means.

According to this structure, an optimum standard flare quantity can be determined for the originals having different characteristics such as a negative-film and a positive-film (a slide-film), or an image of a person and an image of a landscape; hence, a more favorable image quality can be obtained.

DETAILED DESCRIPTION OF THE PREFERRED EMBODIMENT

In the following, examples of the embodiment of this invention will be explained in detail with reference to the drawings.

Figure 1:
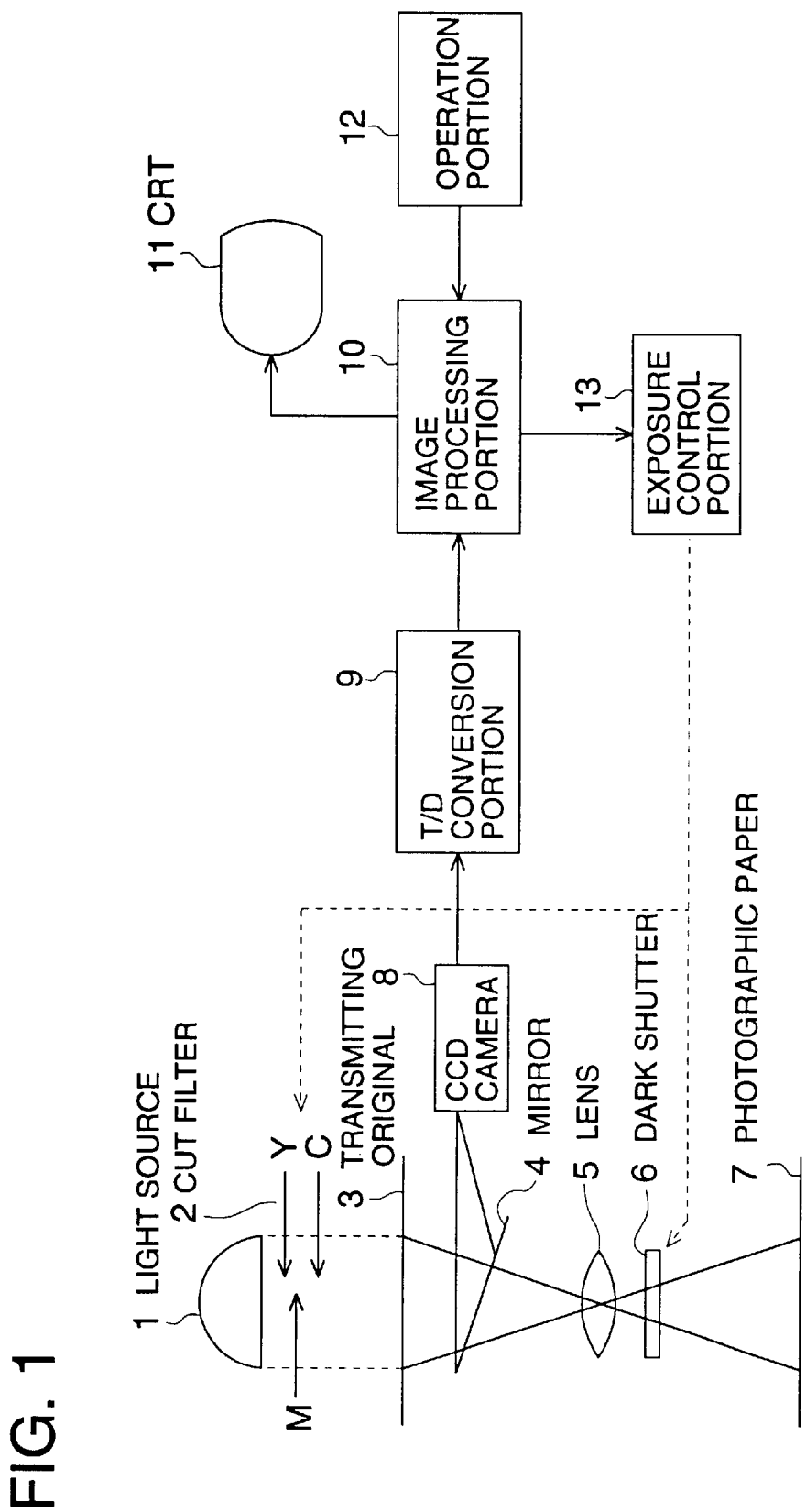
FIG. 1 is a drawing showing an example of the structure of an analogue exposure system to which this invention is applied.

FIG. 1 is a drawing showing an example of the structure of an analogue exposure system to which this invention is applied. The light beam emitted from the light source 1 irradiates the transmitting original (a negative film for example) 3 through the cut filters 2; the cut filters 2 are filters for Y, M, and C intercepting the lights of R, G, and B respectively at predetermined timings.

The light transmitted through the transmitting original 3 is converged by the lens 5 and then focused on the photographic paper 7, where an image is recorded. 4 is the mirror for receiving the transmitted light through the transmitting original, and the reflected light enters into the CCD camera 8, where the mirror 4 is inserted into the optical path only during the pickup of an image signal, and is removed from the optical path during the actual image recording.

The CCD camera 8 converts the transmitted light through the transmitting original 3 into an electrical signal, and this transmittance signal is converted into a density signal in the subsequent T/C conversion portion 9. The output from the T/D conversion portion 9 enters into the image processing portion 10 where the predetermined image processing is executed, then it is displayed on the CRT 11 and is given to the exposure control portion 13 at the same time. The image processing portion 10 carries out the flare correction to be described later, obtains a flare-processed image signal which is obtained by adjusting the flare component contained in the image signal to a suitable quantity, and obtains necessary image characteristic values from this flare-processed image signal. Incidentally, the image characteristic values may be any values that indicate the characteristics of the original image to be processed such as a characteristic point such as the maximum or the minimum, and various kinds of statistical data in the arbitrary divided area. Here, the arbitrary divided areas are areas into which an image is divided for each group of arbitrary plural pixels.

Various kinds of correction values such as a field average density value, a density correction value, and a color correction value are obtained from the above-mentioned statistical data, and the exposure times for the B, G, and R lights are determined on the basis of the correction values and are given to the exposure control portion 13.

Said exposure control portion 13 inserts the components of the aforesaid cut filters 2 to intercept the respective lights for predetermined time periods; and further, controls the dark shutter 6 placed between the lens 5 and he photographic paper 7. 12 is the operation portion for inputting an instruction command or the like to the image processing portion 10.

Figure 2:
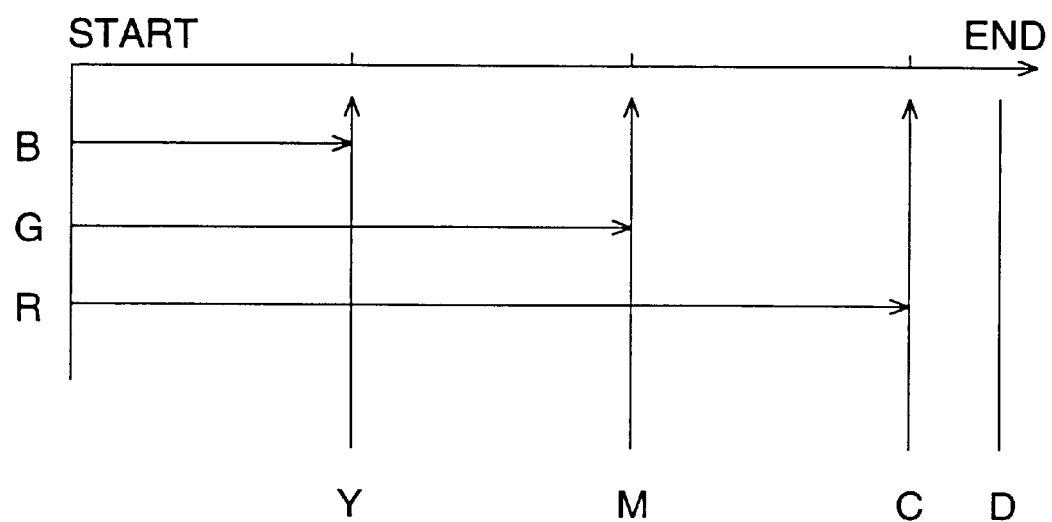
FIG. 2 is an illustration of the operation of the cut filters.

FIG. 2 is an illustration of the operation of the cut filters 2. These cut filters 2 are subjected to filter insertion control by the exposure control portion 13. First, the Y (yellow) filter is inserted into the optical path to intercept the blue (B) light. Next, the M (magenta) filter is inserted into the optical path to intercept the green (G) light, and then the C (cyan) filter is inserted into the optical path to intercept the red (R) light. Regarding the intercepting time periods of these filters, for example, the Y filter is inserted into the optical path after one second, the M filter after two seconds, and the C filter after three seconds, so that the exposure control may be done to make an optimum exposure allotment. Finally, the dark shutter 6 (D in FIG. 6) is shut and the processing is finished. The exposure control can be done by controlling the intercepting time periods of these filters.

In addition, the order to insert the cut filters and each period during which respective color filter is cut off in which the period is short for some color and the period is longer for the other color is an example, and may be varied in accordance with the condition of the image, the result of the above-mentioned image processing, and the instructions of the print operator inputted from the operation portion.

Figure 3:
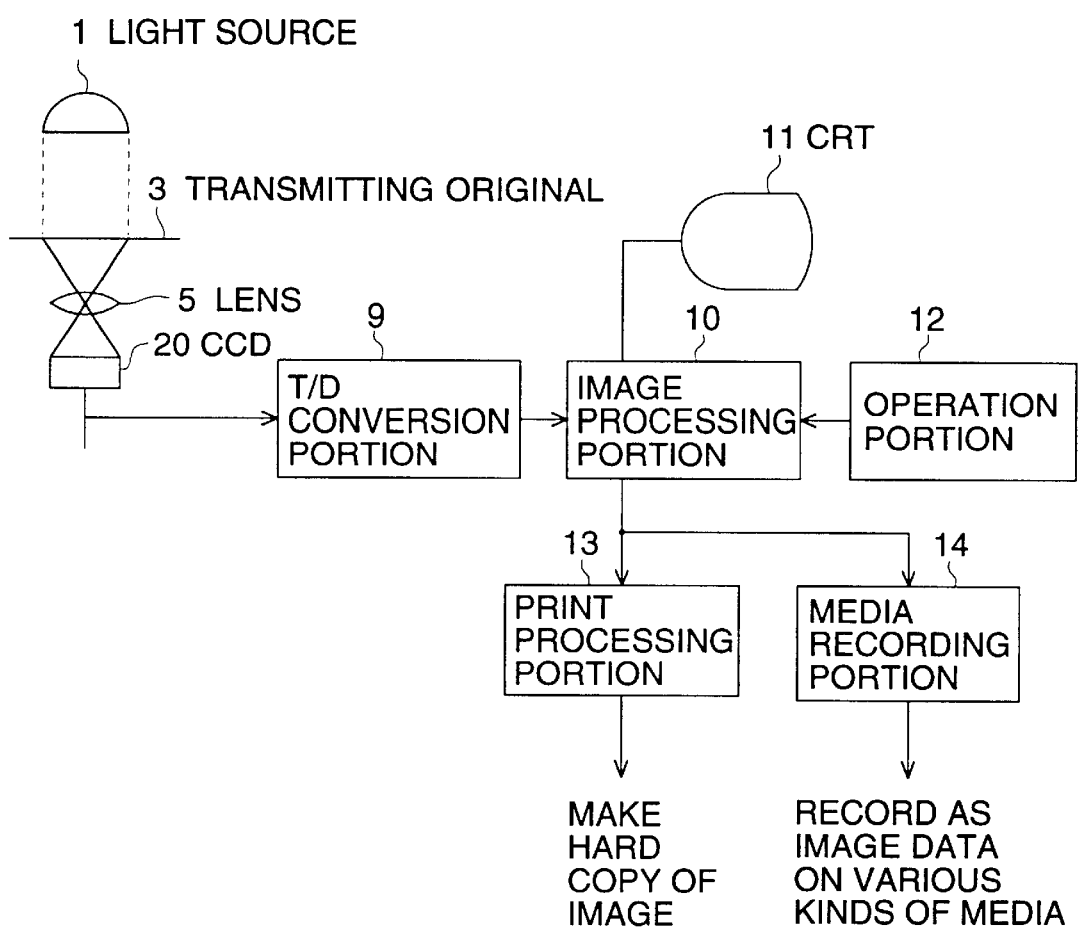
FIG. 3 is a drawing showing an example of the structure of a digital exposure system to which this invention is applied.

FIG. 3 is a drawing showing an example of the structure of a digital exposure system to which this invention is applied. Those items which are the same as shown in FIG. 1 are indicated by the same signs used in FIG. 1. The light emitted from the light source 1 irradiates the transmitting original 3 (a negative-film for example). The light transmitted through the transmitting original 3 is converged by the lens 5, then focused on the CCD 20, and is converted into an electrical signal. This transmittance signal is converted into a density signal by the subsequent T/D conversion portion 9. The output of the T/D conversion portion 9 enters into the image processing portion 10 where the predetermined image processing is executed, then it is displayed on the CRT 11, and at the same time, it enters into the print processing portion where the image is processed to make a hard copy. Further, it enters also into the media recording portion where it is recorded on the various kinds of media as image data.

The image processing portion 10 makes the flare correction, which will be described later, to adjust the flare component contained in the image data, and further, it carries out the adjustment of the image quality such as color tone and brightness to obtain the processed image data. As the adjusting means of image quality, there are some methods, in addition to the technique wherein the various kinds of correction values are obtained from the image characteristic values to automatically adjust the image as shown in the analogue exposure system, such as a method wherein the operator observes the processed image displayed on the CRT and makes an additional correction. By transmitting this processed image data to the print processing portion 13, a hard copy of the processed image is obtained, and further, by transmitting the data to the media recording portion 14, recording of the processed image can be done. 12 is the operation portion for giving various kinds of commands or the like to the image processing portion 10.

Figure 4:
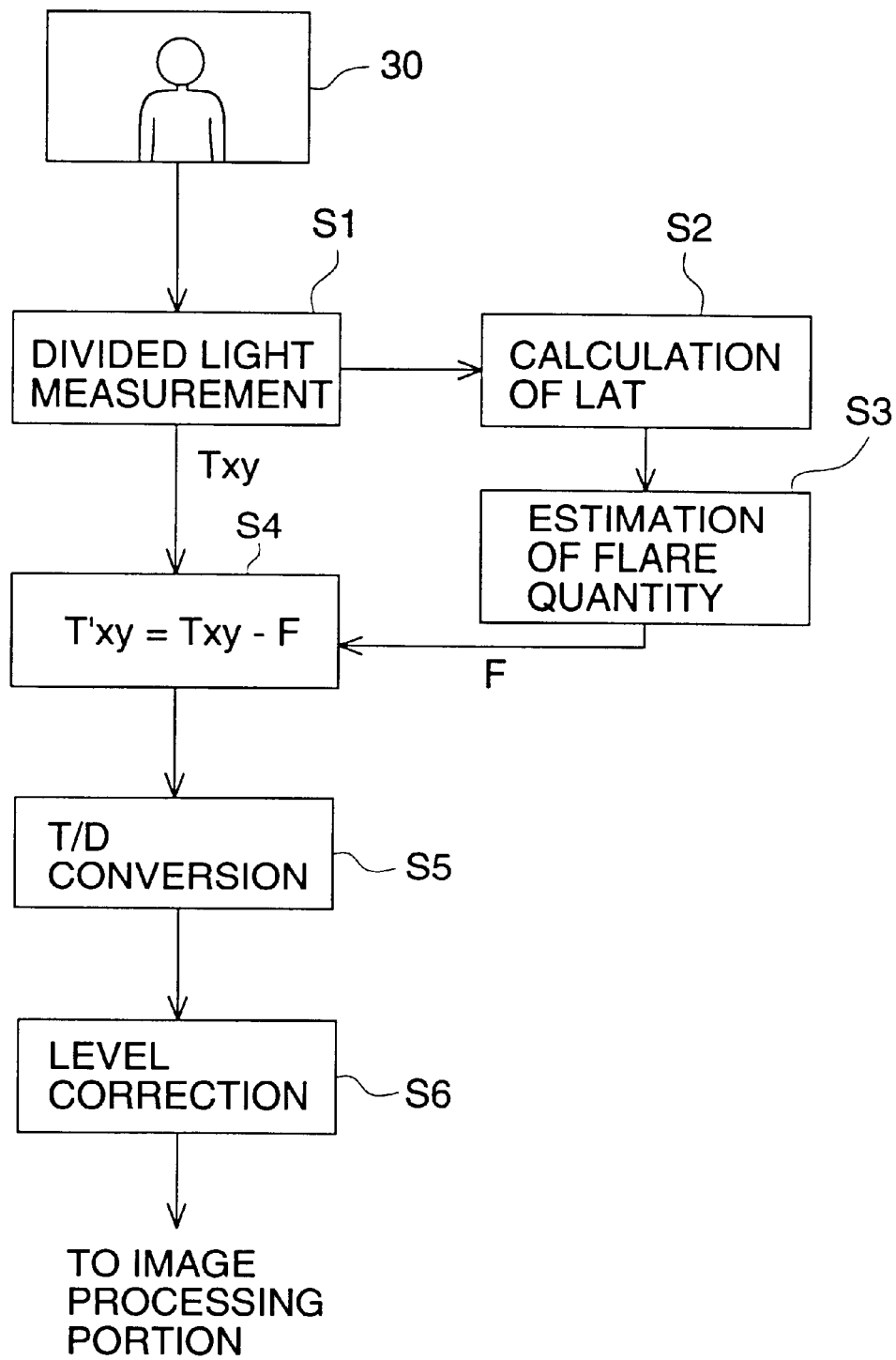
FIG. 4 is a flow chart showing an example of a mode of practice of the first method for correcting a flare quantity.

In the following, the flare correction in the above-mentioned image processing portion 10 will be explained in detail. Incidentally, in the present embodiment, an example in which the image processing means functions as a flare component calculating means, a determining means, a flare amount calculating means and a characteristic value calculating means is explained. However, it may be also possible that these means are provided separately. FIG. 4 is a flow chart showing an example of a mode of practice of the first method for correcting a flare quantity. First, the image 30 is measured for each pixel (S1). The method of measuring light for each pixel reads the transmitting light through the document (transmission type document) for each pixel (or the reflected light from the document (reflection type document)) such that the image 30 becomes plural pixels (for example, 16×16 pixels) and outputs transmittance signals $T_{xy}$ for the respective pixel.

On the other hand, on the basis of the signals given by measuring the light for each pixel, the image processing portion 10 obtains the LAT (the average transmittance of the image) by calculation (S2). The equation for calculating the LAT is expressed as follows:

$$LAT = \frac{\sum_x \sum_y T_{xy}}{n} \quad (1)$$

where n is the number of the total pixels. In addition, this LAT can be obtained, not only by the equation (1), but also by using a light measuring sensor for the LAT receiving the light of the whole field of the image. When the LAT is obtained, estimation of the flare correction value is done on the basis of this LAT (S3). The flare correction value FA as the flare component is expressed by the following equation:

$$FA = LAT \times F \quad (2),$$

where F is a variable concerning the flare, and is expressed by the following equation:

F=(the flare quantity (the flare quantity of the optical system of this system))−(the standard flare quantity)   (3), where the standard flare quantity is a predetermined constant to be described later.

In the following, the method of measuring the flare quantity will be explained.

Figure 5:
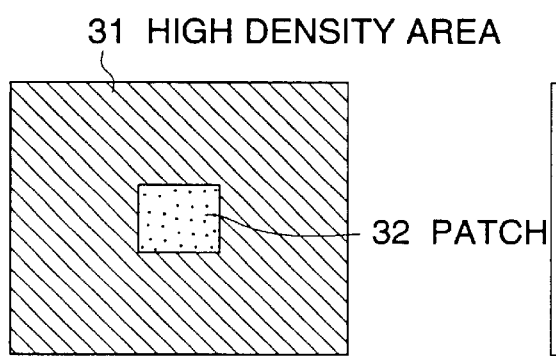
FIGS. 5(a) and 5(b) are illustrations of the measurement of a flare quantity.
Figure 5:
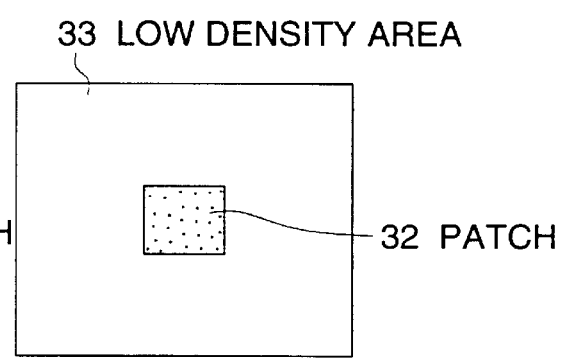

FIG. 5 is an illustration of two kinds of the originals (a) and (b) to be used in the measurement of the flare quantity. (a) has a background 31 of a high density area, and a central portion with a patch 32 of a predetermined density formed. (b) has a background 33 of a low density area, and a central portion with a patch 32 formed. The patch 32 is common to (a) and (b). The originals (a) and (b) are both subjected to the divided light measurement by the image inputting apparatus whose flare quantity is to be obtained.

Now, let PA be the average of the measured light value for the patch portion 32 of the original (a), PB be the average of the measured light value over the whole field of the original (b), and PC be the average of the measured light value of the patch portion 32 of the original (b), then the flare quantity F1 is expressed by the following equation:

$$F1 = (PC - PA)/PB \quad (4).$$

In addition, if the area of the central patch 32 is made to be not larger than one fourth of the area of the whole area of the original, and if the density of the background 33 is determined to be lower than the density of the background 31 by not smaller than 1.0, a sufficient precision of the measurement of flare quantity can be obtained on the basis of a simple equation.

Further, by determining the density of the background 33 to be a lower value than the density of the background 31 to an extent that the density difference does not exceed 2.5, it becomes possible to make a flare quantity measurement in the light measuring region having a high precision of the image inputting apparatus; that is favorable with regard to the precision of the measurement. In short, the measurement of a flare quantity having a high precision can be made simply and quickly without giving a remarkable alteration to the image reading system.

In the operation to measure the above mentioned flare quantity, by providing a set-up mode, the operation after the document (a) and the document (b) are subjected to light measurement may be conducted automatically. With such the manner, if the quality of the read image is changed due to the factor such as the soil or the deterioration with the passage of time on the reading optical system, an image having a predetermined quality can be obtained with the necessary minimum processes.

When the flare quantity is obtained from the equation (4), the absolute quantity of the flare (the flare correction quantity) FA is calculated according to the equation (2).

When the correction value of flare quantity FA is obtained in the step S3, the corrected transmittance for the respective pixel $T_{xy'}$ is obtained according to the following equation (S4):

$$T_{xy'} = T_{xy} - FA \quad (6).$$

When the corrected transmittance value $T_{xy'}$ is obtained according to the step S4, the transmittance is converted into the density (S5). Then, the corresponding level correction is carried out from the obtained density signal D (S6). Now, let D be the density obtained by the T/D conversion, then the density after the level correction D' is expressed by the following equation:

$$D' = D + \log_{10}((LAT - FA)/LAT) \quad (7),$$

where the second term is added to the right-hand side in the equation (7) because the flare correction quantity is subtracted in the equation (6), which causes the density value to be obtained to vary (giving a higher value than the correct value in case of a positive flare correction value), and it is necessary to make a correction for this.

After the above-mentioned image data processing, the image characteristic values are calculated on the basis of the density information obtained from the equation (7), and it is done in the image processing portion 10 according to the predetermined correction equation the processing for determining the conditions for duplicating the image to duplicate the image suitably.

Incidentally, the flare component in the characteristic values to be obtained can be eliminated nearly perfectly by making the standard flare quantity zero in the equation (3). Therefore, according to this example of the embodiment of the invention, the influence of the flare is eliminated nearly perfectly to obtain correct image characteristic values and an image having a stable quality can be obtained.

Further, if the standard flare quantity is determined on the basis of the flare quantity of the image inputting apparatus (the standard unit) used in obtaining the correction equations of an image beforehand, it is not necessary to ask for the correction equations of an image for each of the apparatus, and a result of an image processing with a high quality can be obtained simply. Further, even though the standard unit is different in accordance with the original image to be read such as a negative-film or a positive-film, a result of an image processing with a high quality suitable for the respective kinds of the original can be obtained by switching the standard flare quantity in accordance with the kinds of the original image.

Figure 7:
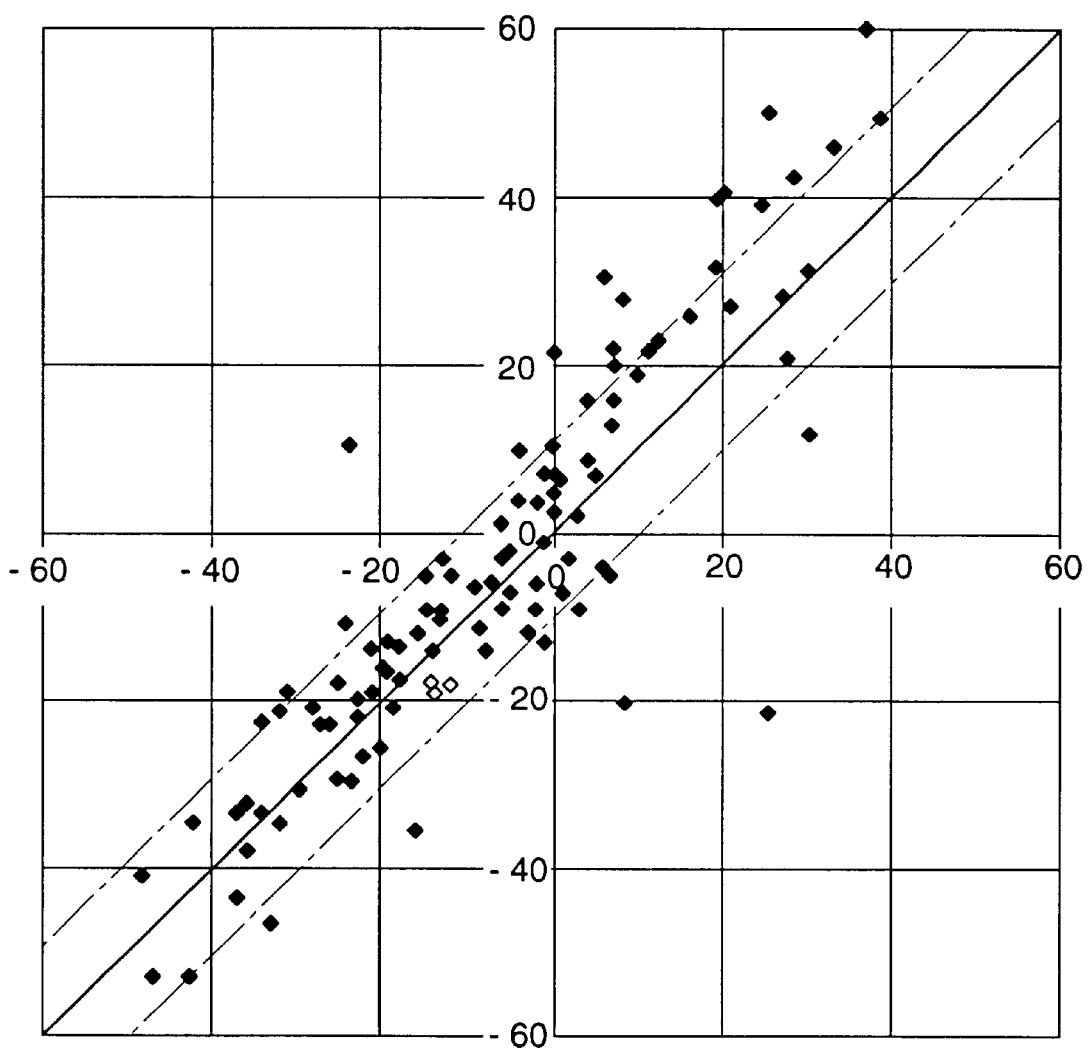
FIG. 7 is a drawing showing the distribution of the density correction values in the case where a flare correction is not made.
Figure 8:
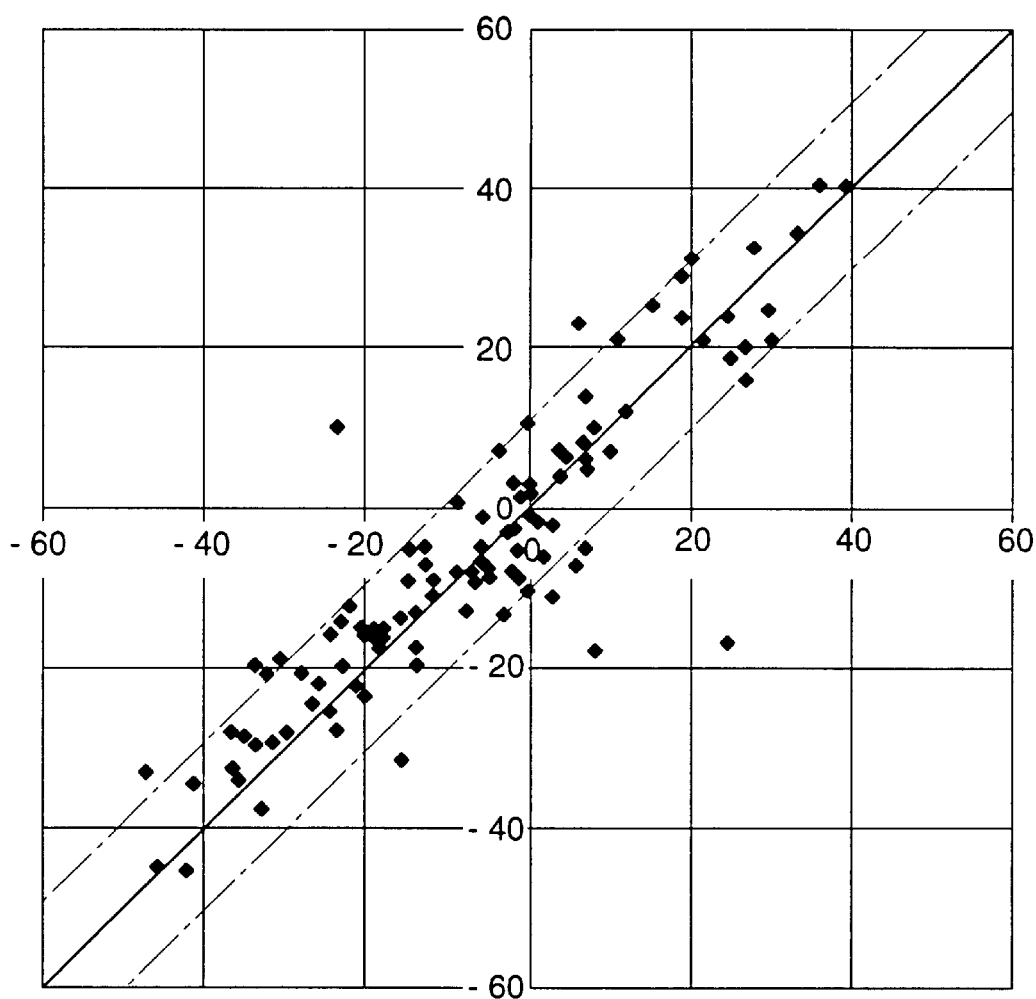
FIG. 8 is a drawing showing the distribution of the density correction values in the case where a flare correction is made.

FIG. 7 is a drawing showing the distribution of the density correction values in the case where the flare correction is not made. The ordinate is the density correction value of the apparatus A, and the abscissa is the density correction value in the case where the equation for calculating the density correction value of the apparatus A is used for the apparatus B. In this case, it is understood that the distribution of the density correction values is broad. FIG. 8 is a drawing showing the distribution of the density correction values in the case where the flare correction of this invention is applied to the apparatus B. According to this drawing, the distribution of the density correction values is concentrated in the neighborhood of the density straight line, and it is understood that a constant automatic correction function can be obtained regardless of the apparatus.

Figure 6:
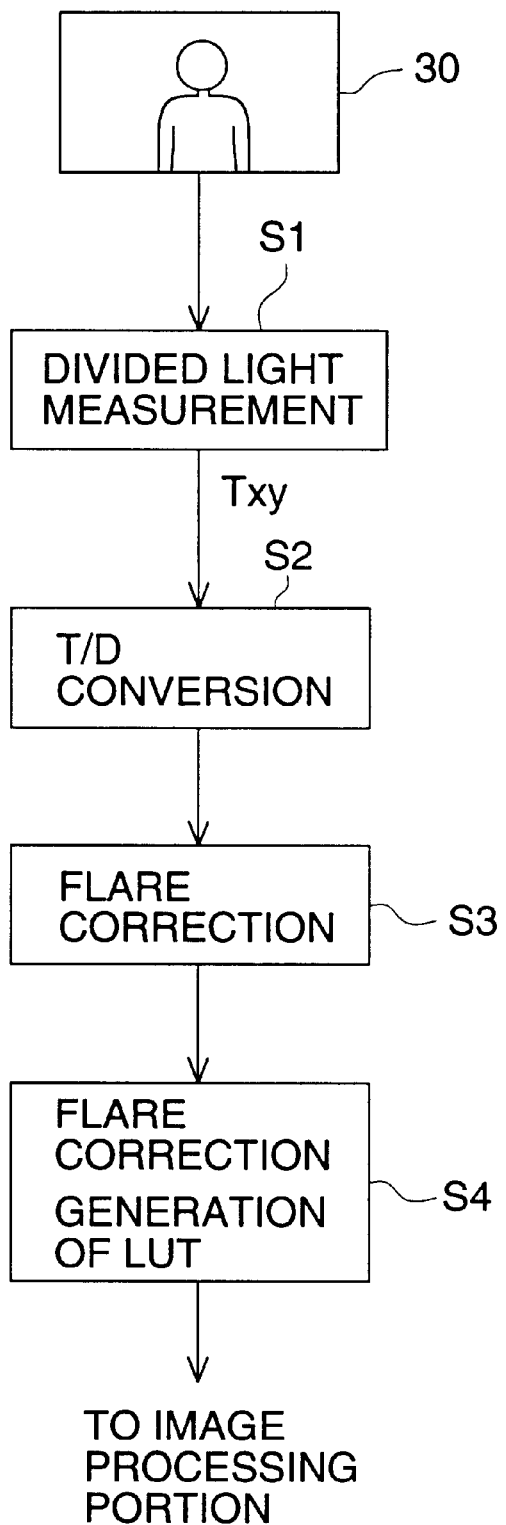
FIG. 6 is a flow chart showing an example of a mode of practice of the second method for correcting a flare quantity.

FIG. 6 is a flow chart showing an example of the embodiment of the second method for correcting the flare quantity (an example of adjusting the image quality by digital image processing). First, the image 30 is subjected to light measurement for each pixel (S1). The method of measuring light for each pixel reads the transmitting light through the document (transmission type document) for each pixel (or the reflected light from the document (reflection type document)) such that the image 30 becomes plural pixels (for example, 1024×1536 pixels) and outputs transmittance signals $T_{xy}$ for the respective pixel.

On the other hand, the image processing portion obtains the density signals D by T/D conversion from the transmittance signals obtained by the light measurement for each pixel (S2). When the density signals for the respective pixels are obtained, the division density data are obtained from these density signals D for the respective blocks (S3), and the flare correction LUT is generated (S4).

In the following, the method for generating the flare correction LUT will be explained. The LAT can be obtained according to the equation (1) beforehand. Next, the flare correction quantity FA can be obtained from the equation (2). In this case, the numerical values 0 to 255 (the density values multiplied by 100) is used as the measured density values D. Then the converted values D' depending on the respective density values D are obtained by the following equation:

$$D'=\{-\log_{10}(10^{-(D/100)}-FA)+\log_{10}((LAT-FA)/LAT)\}\times 100 \quad (8),$$

where the second term of the right-hand side log(LAT−FA)/LAT is a term for adjusting the total level. When the D' data for the respective density data D are obtained according to the equation (8), this relation between the D and the D' is arranged in a form of a look-up table (LUT) and memorized in the apparatus, then the flare-corrected D' data can be obtained by accessing said LUT using the division density data D obtained.

According to this gradation correction method, even though the image data quantity is large, the time for processing the calculation can be shortened owing to processing with the representative data.

The image data having been gradation-corrected by the above-mentioned method are sent to the print processing portion 13, and a hard copy of the gradation-corrected image can be obtained. Further, instead of a hard copy, the gradation-converted image is stored in a recording medium such as a magneto-optical disk in the media recording portion at need.

Incidentally, the flare component contained in an image can be nearly perfectly eliminated by making the standard flare quantity zero in the equation (3). Therefore, according to this example of the embodiment, the influence of the flare is nearly perfectly eliminated to obtain a correct image information, and an image having a stable quality can be obtained.

Further, if the standard flare quantity in the equation (3) is determined on the basis of a flare quantity required for a favorable image reproduction, an image having a desired smoothness or a high modulation can be obtained simply. In addition, the flare quantity required for a favorable image reproduction may be determined on the basis of the flare quantity obtained from an apparatus which makes a favorable image reproduction among various kinds of image processing apparatus, or may be determined to a smaller value or to a larger value according as a higher modulation is required or a smoother gradation is required, in view of the result of the image processing.

Furthermore, if a plurality of standard flare quantity is prepared in a flare quantity memorizing means so as to be selected in accordance with the attributes of the scene such as a person or a landscape, and the kinds of the original such as a negative-film or a positive-film, the flare quantity suitable for the respective attributes of scene and the kinds of original can be determined and a favorable image tone can be expressed.

Up to now, two examples of the embodiment of the invention in which a transmitting original is read and image processing is executed have been shown, however, in case of a reflecting original also, the same processing can be done if the process is handled by replacing the word 'transmittance' in the explaining description with 'reflectivity'.

As has been explained in detail in the foregoing, the invention has following effects:

(1) According to the first image processing method which divides an image of an original into a plurality of pixels for measuring light, obtains image characteristic values on the basis of the data of said measured light, and determines the conditions for duplicating the original on the basis of said image characteristic values, wherein the flare quantity in the light measuring optical system carrying out said measurement of light is obtained, the flare component in said characteristic values is eliminated on the basis of said flare quantity, and the conditions for duplicating the original are determined, correct image characteristic values can be obtained by eliminating the influence of the flare completely, and an image of stable quality can be obtained.

(2) According to the second image processing method which divides an image of an original into a plurality of pixels for measuring light, obtains image characteristic values on the basis of the data of said measured light, and determines the conditions for duplicating the original on the basis of said image characteristic values, wherein the flare quantity in the light measuring optical system of the image processing apparatus is obtained, and the flare component in said image characteristic values is converted into a flare quantity equivalent to a predetermined standard flare quantity from the difference between the obtained flare quantity and said standard flare quantity, an image quality optimized by a standard unit can be obtained simply, by modifying the image characteristic values from the difference between the predetermined standard flare quantity and the measured flare quantity and determining the conditions for duplicating the original.

(3) According to the third image processing method which divides an image of an original into a plurality of pixels for measuring light, and makes image output after executing a predetermined gradation conversion processing, wherein the flare quantity in the light measuring optical system carrying out said measurement of light is obtained and a gradation correcting process for correcting said flare is made, an image having a high modulation influenced by no flare component can be obtained by executing the gradation correcting process making the flare zero on the basis of the flare quantity in the light measuring optical system.

(4) According to the fourth image processing method which divides an image of an original into a plurality of pixels for measuring light, and makes image output after executing a predetermined gradation conversion processing, wherein the flare quantity in the light measuring optical system carrying out said measurement of light is obtained, and said image is converted into an image having a flare quantity equivalent to the predetermined standard value, an image quality having a smooth gradation and a high modulation can be obtained by making a flare correction for an arbitrary flare quantity on the basis of the flare quantity of the light measuring optical system and the predetermined standard value.

(5) According to the image processing method set forth in the paragraph (2) or (4), wherein the aforesaid standard flare quantity is determined to be a value varying in accordance with the kinds of original images, an optimum standard flare quantity can be determined for the originals having different characteristic values such as a negative-film and a positive-film (a slide-film); hence, a more favorable image quality can be obtained.

(6) Further, the aforesaid flare quantity is calculated in such a way as described below:

A first image is obtained by reading a first original having two areas, that is, a central portion which is an area equal to or smaller than one forth of the whole original area and a peripheral portion which is an area except said central portion, by means of the aforesaid light measuring optical system, and a second image is obtained by reading a second original which has a density lower than said first original only in said peripheral by 1.0 to 2.5 by means of said light measuring optical system; then the flare quantity F1 is calculated by the following equation:

$$F1=(PC-PA)/PB,$$

where PA is the average of the measured light values in the central area of the first image, PB is the average of the measured light values in the whole area of the second image, and PC is the average of the measured light values in the central area of the second image. In this way, a measurement of a flare quantity having a sufficiently high brightness can be simply and quickly done without making a remarkable alteration to the image reading system.

(7) According to the seventh structure comprising an image inputting means for obtaining an original image data by dividing an original image into a plurality of pixels for measuring light, a flare quantity correcting means for converting said original image data into a flare-corrected image on the basis of the flare quantity in said image inputting means and a predetermined standard flare quantity, an image processing means for obtaining image characteristic values of the original and determining the conditions for duplicating the image from said image characteristic values, and an image recording means for recording said flare-corrected image on an image recording medium on the basis of said conditions for duplicating, the flare quantity of the image inputting means contained in the read image can be adjusted to a predetermined quantity; hence, a print quality suitable for the purpose can be obtained.

(8) According to the structure set forth in the paragraph (7) further comprising a standard value memorizing means for memorizing a plurality of standard flare quantities, wherein the aforesaid flare quantity correcting means has a function to select out one standard flare quantity from said standard value memorizing means, an optimum standard flare quantity can be determined for the originals having different characteristics such as a negative-film and a positive-film (a slide-film), or an image of a person and an image of a landscape; hence, a more favorable image quality can be obtained.

What is claimed is:

1. An image processing apparatus, comprising:
   an optical system to for irradiating light to an image document, for detecting light transmitting through the image document or light reflected from the image document and for converting the light into electric signals, thereby obtaining a first image information, the optical system having an amount of flare;
   flare amount memorizing means for memorizing an amount of flare of the optical system;
   flare component calculating means for obtaining a flare component contained in the first image information on the basis of the first image information and the flare amount of the optical system; and
   determining means for determining on the basis of the flare component a copy condition on which the image document is copied.

2. The image processing apparatus of claim 1, further comprising:
   flare amount calculating means for calculating the flare amount.

3. The image processing apparatus of claim 1, further comprising:
   characteristic value calculating means for calculating a characteristic value representing a characteristic of the image document on the basis of the first image information, wherein the determining means controls the characteristic value in accordance with the flare component and determines the copy condition on the basis of the characteristic value corrected.

4. The image processing apparatus of claim 3, further comprising:
   standard flare amount memorizing means for a standard flare amount; wherein the flare component calculating means obtains the flare component such that the flare component corresponds to the standard flare amount.

5. The image processing apparatus of claim 4, wherein the standard flare amount memorizing means memorizes plural standard flare amounts in accordance with plural kinds of documents.

6. An image processing apparatus, comprising:

an optical system for irradiating light to an image document, for detecting light transmitting through the image document or light reflected from the image document and for converting the light into electric signals, thereby obtaining a first image information, the optical system having an amount of flare;

flare amount memorizing means for memorizing the amount of flare of the optical system;

flare component calculating means for obtaining a flare component contained in the first image information on the basis of the first image information and the flare amount of the optical system; and image processing means for applying an image processing to the first image information on the basis of the flare component, thereby obtaining a second image information.

7. The image processing apparatus of claim 6, further comprising:

flare amount calculating means for calculating the flare amount.

8. The image processing apparatus of claim 6, further comprising:

standard flare amount memorizing means for a standard flare amount; wherein the image processing means applies the image processing to the first image information such that the flare component corresponds to the standard flare amount.

9. The image processing apparatus of claim 8, wherein the standard flare amount memorizing means memorizes plural standard flare amounts in accordance with plural kinds of documents.

10. The image processing apparatus of claim 6, wherein the image processing means applies the image processing to the first image information so as to eliminate the flare component from the first image information.

11. The image processing apparatus of claim 6, further comprising:

recording means for recording an image on a recording medium on the basis of the second image information.

12. An image processing method, comprising steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and determining on the basis of the flare component a copy condition on which the image document is copied.

13. The image processing method of claim 12, further comprising steps of:

calculating a characteristic value representing a characteristic of the image document on the basis of the first image information; wherein the step of determining the copy condition comprises steps of:

correcting the characteristic value in accordance with the flare component, and determining a copy condition on the basis of the corrected characteristic value.

14. The image processing method of claim 13, wherein the step of obtaining the flare component comprises steps of:

selecting the standard flare amount in accordance with the kind of the image document, and obtaining a flare component on the basis of the selected standard flare amount.

15. The image processing method of claim 13, wherein the step of correcting eliminates the flare component from the characteristic value and determines the copy condition.

16. The image processing method of claim 12, further comprising steps of:

irradiating light to a first test document having a central portion whose area is one forth of the whole area of the first test document or less and a peripheral portion which is an area except the central portion, detecting light transmitting the first test document or light reflected from the first test document, converting the light into electric signals, and obtaining a first test information by the optical system;

irradiating light to a second test document different only in density of the peripheral portion from the first test document, wherein the density of the peripheral portion of the second test document is lower by 1.0 to 2.5 than that of the first test document, detecting light transmitting the second test document or light reflected from the second test document, converting the light into electric signals, and obtaining a second test information by the optical system; and obtaining the flare amount F by the following equation:

$$F=(PC-PA)/PB,$$

where PA is the average of the first test information, PB is the average of the second test information, and PC is the average of information corresponding to the central portion among the second test information.

17. An image processing method, comprising steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and applying an image processing to the first image information on the basis of the flare component and obtaining a second image information.

18. The image processing method of claim 17, further comprising a step of:

selecting the standard flare amount in accordance with the kind of the image document, wherein the step of obtaining the second image information applies the image processing to the fist image information such that the flare component becomes the selected standard flare amount.

19. The image processing method of claim 17, further comprising a step of recording an image on an image recording medium on the basis of the second image information.

20. The image processing method of claim 17, further comprising steps of:

irradiating light to a first test document having a central portion whose area is one forth of the whole area of the first test document or less and a peripheral portion which is an area except the central portion, detecting light transmitting the first test document or light reflected from the first test document, converting the light into electric signals, and obtaining a first test information by the optical system;

irradiating light to a second test document different only in density of the peripheral portion from the first test document, wherein the density of the peripheral portion of the second test document is lower by 1.0 to 2.5 than that of the first test document, detecting light transmitting the second test document or light reflected from the second test document, converting the light into electric signals, and obtaining a second test information by the optical system; and obtaining the flare amount F by the following equation:

$$F=(PC-PA)/PB,$$

where PA is the average of the first test information, PB is the average of the second test information, and PC is the average of information corresponding to the central portion among the second test information.

21. A memory medium capable of memorizing a program capable of executing steps in such a manner that the program can be read from the memory medium by a computer, the steps comprising steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and determining on the basis of the flare component a copy condition on which the image document is copied.

22. The memory medium of claim 21, the steps further comprising steps of:

irradiating light to a first test document having a central portion whose area is one forth of the whole area of the first test document or less and a peripheral portion which is an area except the central portion, detecting light transmitting the first test document or light reflected from the first test document, converting the light into electric signals, and obtaining a first test information by the optical system;

irradiating light to a second test document different only in density of the peripheral portion from the first test document, wherein the density of the peripheral portion of the second test document is lower by 1.0 to 2.5 than that of the first test document, detecting light transmitting the second test document or light reflected from the second test document, converting the light into electric signals, and obtaining a second test information by the optical system; and obtaining the flare amount F by the following equation:

$$F=(PC-PA)/PB,$$

where PA is the average of the first test information, PB is the average of the second test information, and PC is the average of information corresponding to the central portion among the second test information.

23. A memory medium capable of memorizing a program capable of executing steps in such a manner that the program can be read from the memory medium by a computer, the steps comprising steps of:

irradiating light to an image document, detecting light transmitting the image document or light reflected from the image document, converting the light into electric signals, and obtaining a first image information by an optical system;

obtaining a flare component contained in the first image information on the basis of the first image information and the flare amount of the optical system; and applying an image processing to the first image information on the basis of the flare component and obtaining a second image information.

24. The memory medium of claim 23, the steps further comprising steps of:

irradiating light to a first test document having a central portion whose area is one forth of the whole area of the first test document or less and a peripheral portion which is an area except the central portion, detecting light transmitting the first test document or light reflected from the first test document, converting the light into electric signals, and obtaining a first test information by the optical system;

irradiating light to a second test document different only in density of the peripheral portion from the first test document, wherein the density of the peripheral portion of the second test document is lower by 1.0 to 2.5 than that of the first test document, detecting light transmitting the second test document or light reflected from the second test document, converting the light into electric signals, and obtaining a second test information by the optical system; and obtaining the flare amount F by the following equation:

$$F=(PC-PA)/PB,$$

where PA is the average of the first test information, PB is the average of the second test information, and PC is the average of information corresponding to the central portion among the second test information.

* * * * *